United States Patent [19]

Rhett

[11] 4,029,488

[45] June 14, 1977

[54] METHOD OF ADJUSTING GLASS TEMPERATURE IN A FOREHEARTH

[75] Inventor: Chester K. Rhett, Seattle, Wash.

[73] Assignee: C. Rhett, Inc., Tukwila, Wash.

[22] Filed: Aug. 2, 1976

[21] Appl. No.: 711,068

[52] U.S. Cl. .................................. 65/136; 65/135
[51] Int. Cl.² ........................................ C03B 5/02
[58] Field of Search .................... 65/134, 135, 136

[56] References Cited

UNITED STATES PATENTS

| | | | |
|---|---|---|---|
| 1,953,023 | 3/1934 | Mulholland | 65/135 |
| 3,198,618 | 8/1965 | Penberthy | 65/134 X |
| 3,326,655 | 6/1967 | Penberthy | 65/136 X |
| 3,498,779 | 3/1970 | Hathaway | 65/135 X |

*Primary Examiner*—Arthur D. Kellogg

[57] ABSTRACT

The temperature of molten glass conveyed by means of a forehearth between a melting furnace and a discharge orifice in a bowl remote from the furnace is controlled and adjusted thermally by a method that includes an abrupt bottom-zone temperature reduction step in the immediate proximity of the entry of the glass from the furnace to the forehearth cooling zone to a temperature approximately equal to but above a predetermined gob temperature; next the step of blending and homogenizing the cooling glass as it enters the conditioning zone in its downstream movement; and while avoiding above-surface heating during conditioning, subjecting the glass stream only to mild Joule-effect, below-surface heating applied in a controlled manner to accomplish temperature normalization and homogeneity throughout the stream whereupon the glass is delivered to the discharge orifice at a specified temperature.

3 Claims, 2 Drawing Figures

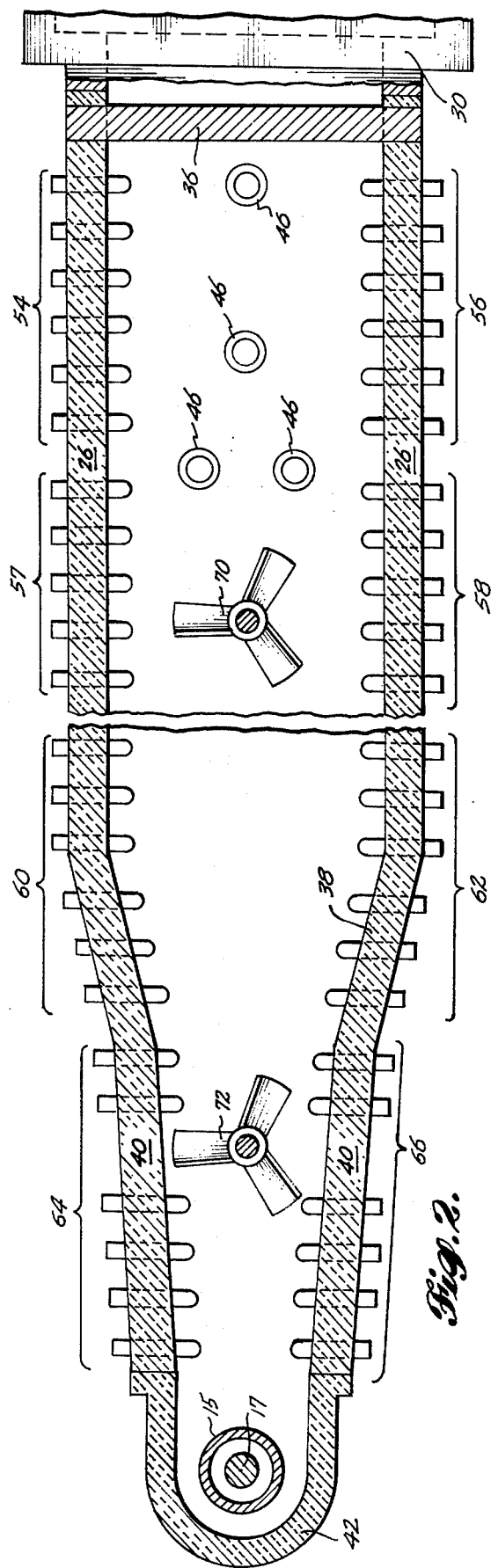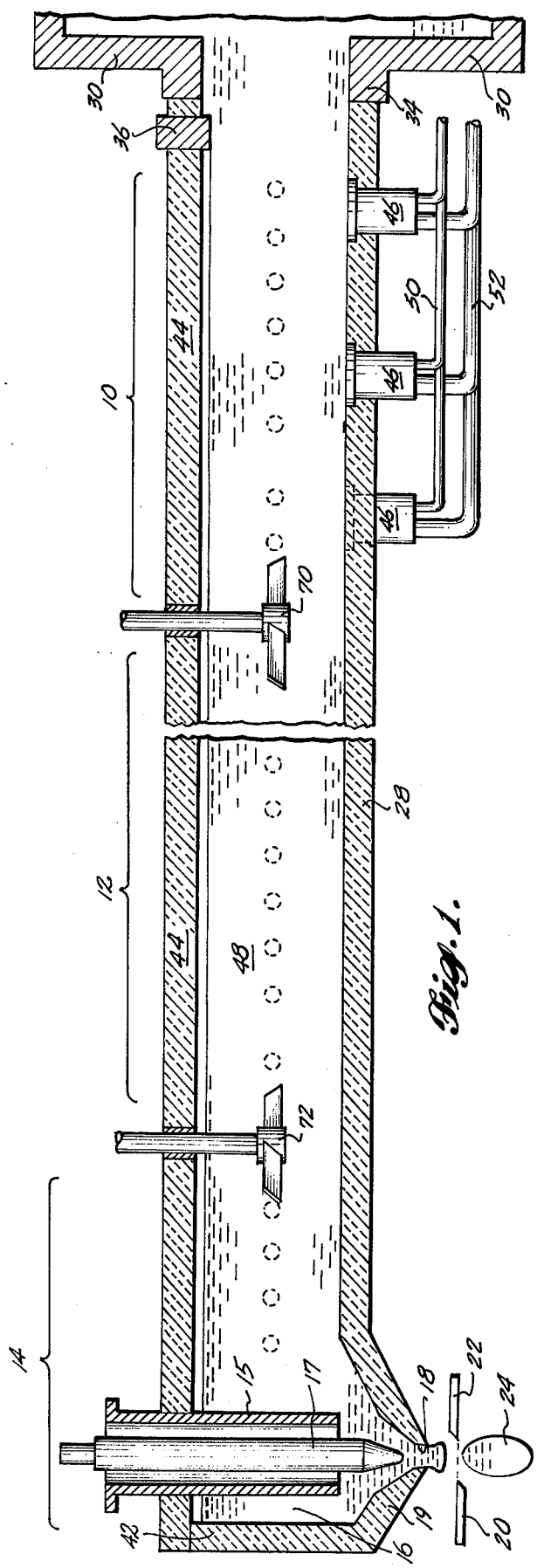

METHOD OF ADJUSTING GLASS TEMPERATURE IN A FOREHEARTH

BACKGROUND OF THE INVENTION

In many, if not most, glass-making operations it is highly desirable that molten glass issuing from the bowl of a forehearth be at predetermined gob temperature for optimum molding or forming into desired articles such as bottles, jars and the like. As a direct result of nonuniformity in gob temperatures there can be (a) uneven distribution of the glass in the sidewalls of containers or bottles; (b) undesirably low wall strength and pressure resistance under testing; (c) poor surface finishes and nonuniform optical properties of the molded glass articles; (d) unduly slow operation of the molding and forming machines seriously affecting the economics of the operation; (e) practical problems involving lack of temperature uniformity between gobs in double and multiple gob operations; and (f) imprecise control of the weight of gobs in the continuing series of gobs being formed.

It is generally recognized that the genesis of the problems lies in the manner heat is removed from the molten stream in the forehearth cooling zone, most of which occur through heat absorption at the floor or bottom and side walls of the forehearth channel. Because these losses are not particularly controllable, the usual temperature homogeneity of the glass inflowing from the furnace is wierdly disrupted as it begins its flow through the forehearth. Nevertheless, it is necessary that the glass be cooled and conditioned to bring it down to the final gob temperature which is materially lower than the temperature prevailing in the furnace. The usual practice has been to allow the temperature to drop slowly from furnace to orifice in a gradually descending curve, the drop being more or less empirically controlled by above-surface and some sub-surface heating of the molten stream. As a result of sub-surface heating, minor Joule-effect currents are generated within the glass stream which tend to produce some slight agitation and, hence, a degree of mixing or blending of the marginal cooler and hotter central portions of the glass. It has been observed that while such manipulations of the glass stream tend to improve the operation to a slight degree, they fall short of completely eliminating the difficulties. One solution attempted has been the addition of a ring electrode in the vicinity of the bowl discharge orifice, however without full or satisfactory homogeneity in the discharged gobs, because often there are super-heated streaks in the gobs caused by the ring heaters themselves. It has therefore been the principal object of this invention to provide a method of operating a forehearth in such manner that the necessary temperature adjustment that must be accomplished in the forehearth channel between the furnace and the discharge orifice is fully controllable to produce gobs of improved uniformity around their surface, to increase forming speeds, to reduce the waste from defective articles due to poor surface and unequal wall thicknesses, and to improve the optical nature of articles formed.

SUMMARY OF THE INVENTION

In accordance with this invention, the accomplishment of the objects thereof is attained by abruptly dropping the temperature of a major portion of the glass stream as it enters the forehearth from the elevated termperature in the furnace to a temperature equal to but above a predetermined gob temperature. Then the stream is almost immediately subjected to mechanical blending and homogenizing just prior to its entry into the conditioning zone of the forehearth where controlled heating, to produce mild Joule-effect currents, acts to permit downward temperature adjustment with normalizing and homogenization occurring in the molten stream prior to gob formation.

BRIEF DESCRIPTION OF THE DRAWINGS

FIG. 1 is a diagrammatic elevation view in longitudinal section of a forehearth incorporating the invention; and FIG. 2 is a diagrammatic plan view in longitudinal section illustrating the invention.

DESCRIPTION OF THE PREFERRED METHOD

With particular reference to FIG. 1 a forehearth is diagrammatically shown as comprising the cooling section 10, the conditioning section 12 and the delivery section 14 containing refractory tube 15. The forehearth terminates in the conventional forehearth bowl 16, having vertically adjustable plunger 17 within tube 15 and associated with the discharge orifice 18 in its bottom 19. Molten glass flows downward through orifice 18 to be transformed into a series of gobs of glass, The molten glass passes between opposed shear blades 20, 22 which are caused to reciprocate across the upright stream to separate a glass portion into a gob 24 which is then appropriately directed to a molding or forming apparatus (not shown).

The forehearth is of conventional channel form having opposed, generally parallel side walls 26, 26 and bottom 28, all formed of refractory material capable of resisting the heat and scrubbing actions of the molten glass flowing from the working section of a conventional glass furnace 30. Glass flows into the forehearth channel from the furnace over mantle block 34 and under the conventional skimmer 36. As can best be seen in FIG. 2, the entry width of the forehearth is reduced by converging side walls 38, 38 and 40, 40 terminating in the conventional bowl 16 of semicircular form comprising bowl wall 42 rising above the bottom 19. Roof or crown 44 covers the full length of the forehearth channel. It should be noted that the forehearth is devoid of above-surface heater means usually found in the space above the molten glass. As a result the forehearth roof is located generally closer to the glass than has been conventional. About one inch between the crown underside and surface of the glass appears to be desirable. Flues and other means to exhaust products of combustion thus may be omitted, making it possible to provide an extremely compact forehearth unit.

The cooling section 10 of the forehearth is provided with a number of heat sinks 46 mounted in bottom 28. The preferred arrangement of heat sinks 46 is best seen in FIG. 2. Each heat sink 46 is a heat-absorbing device permanently installed in the forehearth bottom 28 in contact with the underside of the molten glass stream 48. Each is connected to a fluid supply main 50 and to the discharge manifold 52. The forced circulation of water or steam or air through the heat sinks 46 accomplishes an abrupt reduction of temperature of the lower portion of the glass stream as it enters the forehearth channel from the furnace 30. Preferably the heat sinks 46 are formed of non-contaminating and long-life molybdenum materials. They are sealed in bottom 28 in a leak-proof manner.

Mounted in the walls 26, 26 and comprising a first heating means is two series of sub-surface electrodes 54 and 56 in opposition to each other. The electrodes of the two series are connected in conventional fashion to a suitable adjustable source of power and provide heat in controlled amount, as will be fully understood by those skilled in the art. A second opposed series of sub-surface electrodes 57 and 58 comprise a second system or means for introducing heat to the glass stream in the forehearth. Electrode series 57, 58 are also mounted in walls 26, 26 and are suitably connected to a controllable source of electrical energy. A third opposed series of sub-surface electrodes 60 and 62, likewise suitably connected to a controllable power source, is located in the throat of the necked-down conditioning portion of the forehearth channel between converging walls 38, 38. It comprises a third and independently adjustable heat introduction means operable upon the glass stream. A final or fourth means for introducing heat to the glass is provided by the opposed electrode series 64, 66 in the final delivery end of the conditioning section of the forehearth channel between walls 40, 40. These electrodes are also incorporated in circuit with an adjustable source of electrical power.

In a forehearth channel where the cooling section 10 is approximately five feet long and the conditioning section 12 is about another 11 or 12 feet in length, it is preferred that the first electrode series 54, 56 comprises six electrodes to a side; the second series 57, 58, five electrodes to a side; the third series 60, 62, six electrodes to a side; and the final or fourth series 64, 66, six electrodes to a side. All electrodes in matched pairs are disposed beneath the surface of glass stream 48 about one-half the way up from channel bottom 28. The electrodes of the several series create mild Joule-effect currents throughout the moving glass in the forehearth in the manner well known to those skilled in the pertinent art.

Located in the forehearth channel in following relation to the heat sinks 46 is a stirrer or blender mechanism 70 which operates in the molten stream of glass in the usual manner. The glass, having been subjected to appreciable temperature reduction by contact with the channel walls 26, 26 and bottom 28, and also having had the temperature abruptly reduced by heat sinks 46, will be non-homogeneous in front of blender 70. The operation of blender 70 is such that the cooler and hotter portions of the glass are mixed and stirred and blended to reach substantial homogeneity as the glass moves downstream toward and through the conditioning zone of the initial and the necked-down forehearth channel portions.

A conventional forehearth is operated to receive glass from the furnace at an elevated temperature relative to the desired and predetermined gob delivery temperature, to slowly cool the glass as it passes through the forehearth and to supply heat thereto, usually at the glass surface, to make up for temperature losses in the glass stream along those portions in contact with the channel bottom and sides. In accordance with this method, in close proximity to the furnace, the lower and central and medial portions of the entering glass in the forehearth stream are abruptly cooled to a temperature approximately equal to but above the predetermined gob temperature. Immediately after this abrupt cooling operation the glass stream will comprise an upper central portion still of high temperature overlying the lower cooled portion and embraced by cool side portions. Despite the Joule-effect currents, non-homogeneity of the glass must be overcome, as described by the mechanical blending step. The resultant forward-moving stream, being more homogeneous, receives further conditioning heat and is subject to mild Joule-effect currents from below the surface as it passes between electrode series 60, 62 and 64, 66. The length of time any transverse portion of the constantly moving glass stream passes through the conditioning zone is arranged to be at least twice the length of time such portion was subjected to abrupt temperature reduction in the first cooling zone proximate the heat sinks 46.

On occasion it is preferable to subject the molten glass to further stirring and blending near the end of its conditioning. This is accomplished by the operative rotary stirrer/blender 72 located approximately between the third and the final series of electrodes, i.e., between series 60, 62 and series 64, 66. The speed of rotation of the stirrers or blenders 70 and 72 will be adjusted by the operator of the system as he observes whether his glass gobs being formed have the desired weight, color and homogeneity. He will vary rotational speeds as his observations dictate.

This forehearth system of avoiding the prior practice of supplying heat to the surface of the glass provides several advantages not readily discernible to those skilled in this art. By supplying controlled heat solely below the glass surface, the vertical height of the forehearth is reduced by reason of the elimination of the previously considered mandatory firing chamber located over the molten glass. Thus, roof 44 is located in very close proximity to the glass surface as shown. And the molten glass, for all practical purposes, is encapsulated in refractory material evenly applied about it the full length of the forehearth. As a result, the pattern of heat transfer from the glass to the forehearth floor, walls and roof is materially altered by comparison with prior systems. In conventional prior forehearths it has been observed that of the total heat transferred into and through the refractories, approximately 40% is dissipated in the floor structure, 50% via the crowned or arched roof and its supporting structure, and the remaining 10% being dissipated about equally through the two side walls. By comparison, in this system the heat reduction of the glass stream is divided about equally between the floor 28, each of the two side walls 26, 26 and the roof 44. The result is that the molten stream has a balanced condition in that each of its four outside portions are losing temperature at approximately the same rate through conduction via the refractories.

Since the main objective in passing the glass through the forehearth is to downwardly adjust its temperature as delivered to the discharge orifice, and to deliver it to said orifice in as uniformly homogeneous condition as possible, the maintenance of symmetry in the heat reduction action is very important, particularly in delivering molten glass to the gob orifice without the usual troublesome hot streaks in the gob. by insuring symmetry in the peripheral temperatures of the glass stream, it becomes possible to employ mild Joule-effect currents to act upon the stream of glass and to overcome non-homogeneity in the glass. The use of Joule-effect currents is contraindicated. (See U.S. Pat. No. 3,326,655.)

Having in mind the foregoing description of forehearth apparatus, it will be seen that the several steps of the claimed method can be related to the elements of the apparatus. For example, the location of the heat sinks 46 in close proximity to the stream of molten glass at temperatures of around 2350° to 2400° F as it enters the forehearth essentially accomplishes the abrupt temperature reduction. The heat sinks, being located wholly within the cooling zone 10, function to reduce by about 250°–300° F the lower central or medial portion of the glass stream to a temperature approximately equal to but above the predetermined gob temperature. This means that the temperatures of the top and side portions of the glass stream will be elevated relative the lower portion. In other words, the flowing glass will have an overall mean temperature of about 2200° F. but with a disparity of temperatures in cross-section.

To initiate temperature homogeneity in the glass stream, it is next almost immediately subjected to mechanical blending through the action of the rotary blender/stirrer 70. This results in the various portions of the glass stream being drawn together and being thoroughly mixed as it moves into zone 12 through which it passes for a period of time due to the extra length of zone 12 vis a vis zone 10, at least twice that when the inflowing molten glass was being subjected to abrupt temperature reduction. During this period, normalizing and homogenizing take place, aided in part by subjecting the stream to mild Joule-effect currents as required and as indicated to the operator by observations at the gob discharge orifice.

In the event that the glass is evidencing strings of overly hot glass within the whole body, the operator may subject the stream to further homogenizing and mixing just before entry to the bowl 42. This is accomplished by rotation of blender/stirrer 72.

By this method glass is delivered to the bowl at about 2050°–2075° F. with markedly superior uniformity and homogeneity as compared with known earlier forehearth operations.

In compliance with the statute, the invention has been described in language more or less specific as to structural features. It is to be understood, however, that the invention is not limited to the specific features shown, since the means and construction herein disclosed comprises a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. The method of delivering molten glass at a predetermined gob temperature from a melting furnace to an orificed forehearth bowl, comprising:
    1. in the forehearth in close proximity to the entry of molten glass from said furnace, abruptly reducing the temperature of a lower central portion of the glass stream to a temperature approximately equal to but above the predetermined gob temperature;
    2. immediately following the temperature reduction, mechanically blending and homogenizing the glass as it moves downstream;
    3. continually applying a mild Joule-effect, below-surface conditioning heat to said stream for a period of time at least twice the length of time said stream was subjected to abrupt temperature reduction and permitting downward temperature adjustment to substantially the predetermined gob withdrawal temperature accompanied by temperature normalization throughout the stream; and
    4. discharging the glass through the orifice of said bowl in the form of a series of uniform gobs.
2. The method of conditioning a stream of molten glass in a forehearth in the absence of above-surface heating of the glass as it flows downstream from a furnace toward a bowl having an orifice for glass gob withdrawal at a predetermined temperature, comprising:
    1. establishing a continuously moving stream of molten glass flowing through a forehearth between a melting furnace and a forehearth bowl;
    2. abruptly reducing from below the surface the temperature in the central zone of the molten glass stream proximate its entry to the forehearth from the furnace to a temperature approximately equal to but above the preferred gob withdrawal temperature;
    3. mechanically blending and homogenizing the flowing temperature-reduced stream of molten glass as it moves downstream away from the furnace;
    4. subjecting the mechanically blended and substantially homogenized stream of molten glass solely to mild Joule-effect, below-surface conditioning heat for a period of time, at least twice the length of time said stream of molten glass was subjected to abrupt temperature reduction and, during said longer time period, accomplishing downward temperature adjustment to substantially the predetermined gob withdrawal temperature to accomplish temperature normalization throughout the stream; and
    5. discharging the glass through said bowl orifice in the form of a continuous series of uniform gobs.
3. The method of claim 2 in which, proximate the entry of the glass to the forehearth bowl, the stream of molten glass is subject to mechanical blending and homogenizing.

* * * * *